United States Patent
Beckmann et al.

(10) Patent No.: US 7,756,074 B2
(45) Date of Patent: Jul. 13, 2010

(54) METHOD FOR THE TRANSMISSION OF AT LEAST ONE GROUP MESSAGE, CORRESPONDING NETWORK CONTROL UNIT AND RADIO COMMUNICATION DEVICE

(75) Inventors: Mark Beckmann, Braunschweig (DE); Michael Eckert, Braunschweig (DE); Norbert Schwagmann, Braunschweig (DE)

(73) Assignee: Siemens Aktiengesellschaft, Munich (DE)

( * ) Notice: Subject to any disclaimer, the term of this patent is extended or adjusted under 35 U.S.C. 154(b) by 485 days.

(21) Appl. No.: 10/519,348

(22) PCT Filed: Jun. 23, 2003

(86) PCT No.: PCT/DE03/02082

§ 371 (c)(1),
(2), (4) Date: Dec. 27, 2004

(87) PCT Pub. No.: WO2004/004392

PCT Pub. Date: Jan. 8, 2004

(65) Prior Publication Data

US 2005/0207372 A1 Sep. 22, 2005

(30) Foreign Application Priority Data

Jun. 28, 2002 (DE) .............................. 102 29 056

(51) Int. Cl.
*H04L 1/00* (2006.01)

(52) U.S. Cl. ..................... 370/328; 370/432; 370/312; 370/252

(58) Field of Classification Search .......... 455/517–519, 455/450, 452.1, 422.1, 500, 507, 509, 412.1, 455/412.2; 370/431, 453, 432, 433, 458, 370/328, 312, 338, 310.2, 252
See application file for complete search history.

(56) References Cited

U.S. PATENT DOCUMENTS 6,226,641 B1 * 5/2001 Hickson et al. ................ 707/8

(Continued)

FOREIGN PATENT DOCUMENTS

CN 1344476 10/2002

(Continued)

OTHER PUBLICATIONS

3GPP TS 25.222 V5.0.0 3rd Generation Partnership Project: Technical Specification Group Radio Access network; Multiplexing and channel coding (TDD): (Release 5) V5.0.0 (Mar. 2002) pp. 1-60.

*Primary Examiner*—George Eng
*Assistant Examiner*—Brandon J Miller
(74) *Attorney, Agent, or Firm*—King & Spalding L.L.P.

(57) ABSTRACT

A method is provided for the transmission of at least one group message to at least one group of one or more radio communication devices in at least one radio cell of a radio communication network, working in particular on the UMTS standard, using at least one linked set of data, transmitted during at least one time interval from at least one transport channel, in particular embodied as a DSCH channel, to a multiplex channel, in particular embodied as a CCTrCH, whereby permitted data sets are determined with a flag, identifiable by a first indicator, whereby the first indicator is allocated to the group during the time interval. The present invention further provides for a network control unit and a radio communication device with the capacity to carry out the method.

10 Claims, 4 Drawing Sheets

U.S. PATENT DOCUMENTS

| | | | |
|---|---|---|---|
| 6,385,461 B1 | 5/2002 | Raith | |
| 6,640,105 B1* | 10/2003 | Shin | 455/453 |
| 6,725,039 B1* | 4/2004 | Parmar et al. | 455/436 |
| 7,035,657 B2* | 4/2006 | Chen et al. | 455/518 |
| 7,187,708 B1* | 3/2007 | Shiu et al. | 375/148 |
| 7,627,694 B2* | 12/2009 | Sreenivasan et al. | 709/251 |
| 2001/0036810 A1* | 11/2001 | Larsen | 455/11.1 |
| 2001/0036823 A1* | 11/2001 | Van Lieshout et al. | 455/418 |
| 2002/0111180 A1* | 8/2002 | Hogan et al. | 455/518 |
| 2003/0069020 A1* | 4/2003 | Speight | 455/450 |
| 2003/0087653 A1* | 5/2003 | Leung et al. | 455/502 |
| 2003/0189918 A1* | 10/2003 | Das et al. | 370/349 |
| 2004/0043783 A1* | 3/2004 | Anderson | 455/522 |
| 2004/0209638 A1* | 10/2004 | Beckman et al. | 455/522 |

FOREIGN PATENT DOCUMENTS

| | | |
|---|---|---|
| DE | 100 64 107 | 6/2002 |
| DE | 101 32 273 | 1/2003 |
| DE | 101 38 717 | 2/2003 |
| DE | 101 54 428 | 3/2003 |

* cited by examiner

METHOD FOR THE TRANSMISSION OF AT LEAST ONE GROUP MESSAGE, CORRESPONDING NETWORK CONTROL UNIT AND RADIO COMMUNICATION DEVICE

CROSS-REFERENCE TO RELATED APPLICATIONS

This application is a U.S. national stage application of International Application No. PCT/DE03/002082 filed Jun. 23, 2003, which designates the United States of America, and claims priority to German application number 102 29 056.3 filed Jun. 28, 2002, the contents of which are hereby incorporated by reference in their entirety.

BACKGROUND OF THE INVENTION

With many services and applications provided in mobile radio systems, such as news groups, video conferences, video on demand, distributed applications, etc., it is necessary to transmit messages not just to one but to two or more mobile radio users.

In principle, it is possible to this end when transmitting messages to the different users to send each recipient a copy of the data. This method is simple to implement but requires a very high bandwidth, particularly for large groups, as the message is transmitted via a number N of individual connections (unicast connections) and is thereby sent a number of times via common connection paths, whereby N specifies the number of recipients of the message.

A so-called point-to-multipoint transmission (multicast transmission) is therefore deployed in modern mobile radio systems, characterized by the fact that different users, to whom the same message is to be transmitted, are combined in a group (multicast group), with one address (multicast address) being assigned to this group, so that data to be transmitted is sent only once to this multicast address and is ideally sent only once via common connection paths from the sender to the recipients. The sender does not have to know how many recipients are concealed behind the multicast address. In order to receive the messages of a specific multicast group, a user simply has to register with the multicast group.

Alternatively, a method referred to as broadcast also may be deployed, in which messages are sent to all users within a regional area, whereby this area, in which the broadcast messages are transmitted, is referred to as the broadcast area and the size of the broadcast area is determined by the network operator. Ideally, the message is thereby sent only once with this method as well. It is, however, a disadvantage here that with this method all users within the broadcast area are always able to read broadcast messages.

To understand the problems more easily, individual components of the architecture of a UMTS mobile radio network are examined in more detail below by way of an example; in particular, the different types of channel known from this context, which are used as the interface between different layers and protocols of the so-called protocol stack provided according to the OSI reference model.

FIG. 1 shows the interfaces between a data link layer LAYER2 provided according to the OSI reference model, including a protocol for medium access control MAC and a protocol to support segmentation and return for useful data and signaling data (radio link control) RLC, and the bit transmission layer (physical layer) LAYER1.

Data is transmitted on logical channels between RLC and LAC, whereupon in MAC the logical channels LogCH are mapped onto transport channels TrCH according to specific rules, whereby it is also possible for a number of logical channels LogCH to be mapped onto a transport channel TrCH by multiplexing.

Logical channels LogCH, which are mapped onto the same transport channel TrCH, have to satisfy identical or similar requirements with regard to transmission quality and quality of service (QoS).

Corresponding steps are therefore implemented for each transport channel TrCH in the bit transmission layer LAYER1, such as the appending of so-called CRC blocks, which can be used to identify transmission errors, and channel coding, which can be used to correct errors that occur.

When these steps have been implemented for each of the transport channels TrCH, specific transport channels TrCH are multiplexed on a so-called coded composite transport channel CCTrCH within the bit transmission layer LAYER1. This coded composite transport channel CCTrCH is then, in turn, mapped onto one or a number of physical channels PhyCH and transmitted via an air interface defined according to UMTS.

Data in the form of so-called transport blocks (TB) is transmitted on the transport channels TrCH. A number of TBs thereby may be transmitted at the same time within a specific time interval (Transmission Time Interval TTI) in the form of a so-called transport block set (TBS).

Parameters such as the size of a transport block, the number of transport blocks transmitted per transport block set, the duration of a time interval, like other parameters, are defined by a so-called transport format (TF). The set of all transport formats that can be used by a transport channel TrCH is, in turn, defined by a transport format set (TFS). A so-called transport format identifier (TFI) is defined to identify a specific transport format within a transport format set.

Transport blocks of different transport channels TrCH, which are mapped onto the same coded composite transport channel CCTrCH during a time interval, have to satisfy specific prerequisites; i.e., not every combination of transport blocks is permitted.

Permitted combinations of transport blocks of different transport channels TrCH, which can be mapped onto the same coded composite transport channel during a time interval, are defined by so-called transport format combinations (TFC). The set of all permitted transport format combinations is, in turn, defined by a so-called transport format combination set (TFCS).

A so-called transport format combination indicator (TFCI) is defined to identify certain transport format combinations within a transport format combination set. As such, the transport format combinations used, which can change from time interval to time interval, do not have to be defined specifically every time and transferred to a mobile radio device, but can be referred to by an indicator (the transport format combination indicator) on a list of transport format combinations in a very efficient manner.

A further increase in efficiency is achieved in that when the transport format combinations are being configured they are not transmitted specifically but a calculated transport format combination (CTFC) is calculated, from which the transport format identifier then may be calculated back in the mobile radio device, indicating the corresponding TFs within the transport format sets of the individual transport channels TrCH and the required transport format combination, in turn, results.

So that a mobile radio device can forward data, which it receives via its physical channels, via transport channels TrCH to higher protocol layers, it has to know the transport formats of the individual transport channels TrCH. If a number of transport channels TrCH is mapped onto a coded composite transport channel, it must know the transport formats of each individual transport channel TrCH, in order to allocate the data packets with different characteristics (according to the different transport formats) correctly to the individual transport channels TrCH. Even if a mobile radio device is, for example, only "interested" in the data from one of eight transport channels TrCH, it must know the transport formats of all eight transport channels TrCH.

According to the prior art, transport format combination indicator TFCI values are determined and sent in a user-specific manner.

A mobile radio device, which only belongs to one multicast group and accordingly receives data via only one transport channel TrCH, would have to know the TFS of a total of 8 transport channels TrCH instead of just that of one transport channel TrCH if, for example, a total of 8 transport channels were mapped onto the CCTrCH.

This method might be simple to implement but it has the major disadvantage, on the one hand, that an unnecessarily large storage capacity is required in the mobile radio device and, on the other hand, that it increases the signaling processing outlay in the mobile radio device.

The present invention is, therefore, directed toward sending and receiving multicast messages in a mobile radio network, particularly a so-called third generation network, in a manner that is simple and economical as far as resources are concerned.

SUMMARY OF THE INVENTION

Accordingly, a method is provided for transmitting at least one group message to at least one group of one or a plurality of radio communication devices in at least one radio cell of a radio communication network, particularly one operating according to the UMTS standard, using at least one linked set of data transmitted during at least one time interval from at least one transport channel, particularly configured as a DSCH channel, to a multiplex channel, particularly configured as a CCTrCH, whereby permitted data sets are determined with a flag, identifiable via a first indicator, whereby the first indicator is assigned to the group during the time interval.

The present invention is also directed toward a radio communication device and a network control unit, each having the capacity to implement the method.

In a UTMS system, the present invention is advantageously implemented via a method for configuring the assignment of TFCI values to CTFC values in a manner specific to the mobile radio device, manner taking into account common TFCI values for a recipient group.

With configuration of TFCI values and associated CTFC values that is specific to the mobile radio device, it is taken into account according to the present invention that a specific TFCI value has the same significance for all mobile radio devices for the period of transmission of the data (TTI) for this multicast group, whereby it is possible for the CTFC values of the individual mobile radio devices assigned to this TFCI value to be different. "The same significance" here refers to, for example, all mobile radio devices listening to the same physical channel at the time of transmission of the data for the multicast group and the transport channel used using the same TF.

The configuration of TFCI values and associated CTFC values is specific to the UE. In other words, every mobile radio device that is registered with an MC group receives its own configuration of TFCI values and associated CTFC values as a function of the number and identity of the multicast groups it is registered with and such configuration can be different from the configurations of other mobile radio devices belonging to the same MC group.

One advantage of the present invention is that a mobile radio device that belongs to one or a number of multicast groups only has to know the TFSs of the TrCHs for its multicast groups but not those of the other multicast groups, which are transmitted via further TrCHs, which are mapped onto the same CCTrCH.

It is particularly advantageous thereby that the signaling processing outlay and storage requirement in the mobile radio devices are reduced, as the data of all the TrCHs does not have to be recorded, buffered and processed.

Additional features and advantages of the present invention are described in, and will be apparent from, the following Detailed Description of the Invention and the Figures.

BRIEF DESCRIPTION OF THE FIGURES

Elements with the same function and mode of operation are assigned the same reference characters in FIGS. 1 to 4.

DETAILED DESCRIPTION OF THE INVENTION

For this exemplary embodiment, it is assumed for the sake of simplicity that a first radio communication device (mobile radio device, user equipment UE) UE1, a second radio communication device UE2 and a third radio communication device UE3 are located in a mobile radio cell, in which messages are offered from a first multicast group MC1, a second multicast group MC2 and a third multicast group MC3.

It should also be assumed that the first radio communication device UE1 is registered with the first multicast group MC1 and the third multicast group MC3, the second radio communication device UE2 is registered with the second multicast group MC2 and the third multicast group MC3 and the third radio communication device UE3 is registered with the first multicast group MC1, the second multicast group MC2 and the third multicast group MC3.

To transmit data of a multicast group MC1, MC2, MC3 transport channels TrCH are to be used, which a number of mobile radio devices can use in a common manner. In particular, transport channels TrCHs according to UMTS of the downlink shared channel DSCH type are to be used, DSCH type transport channels being used for irregular data traffic. A mobile radio device can have no, one or a number of DSCH type transport channels at the same time. All DSCHs of a mobile radio station are mapped exclusively onto one CCTrCH. The resource, that is when data transmitted via a DSCH is received, is allocated to a mobile radio device via a dedicated physical channel (PDCH) associated with the DSCH. A TFCI is thereby transmitted via the DPCH, which indicates, for example, the physical channel on which the DSCH is next transmitted and which CTFC or TFs should be used on the TrCHs, which are allocated for each time interval TTI according to the present invention to a group MC1, MC2, MC3 of mobile radio devices UE1, UE2, UE3, whereby transport channels of a different type also may be used, alternatively, for the transmission of group messages.

Preferably, just one multicast group MC1, MC2, MC3 is mapped onto just one transport channel TrCH. Mobile radio stations UE1, UE2, UE3, which belong to one or a number of multicast groups MC1, MC2, MC3, must then receive the corresponding transport channel TrCH. The CCTrCH, onto which the transport channels TrCHs are mapped, is therefore assigned exclusively to the respective multicast groups MC1, MC2, MC3 according to the present invention; i.e., no other channels, such as DCHs, can be mapped onto this CCTrCH.

Data of the individual multicast groups MC1, MC2, MC3 is mapped onto the CCTrCH according to the present invention via the associated transport channels TrCH using the so-called time multiplex method. In other words, only data of a specific multicast group MC1, MC2, MC3 is transmitted in each instance onto the CCTrCH at a specific time.

Figure 1:
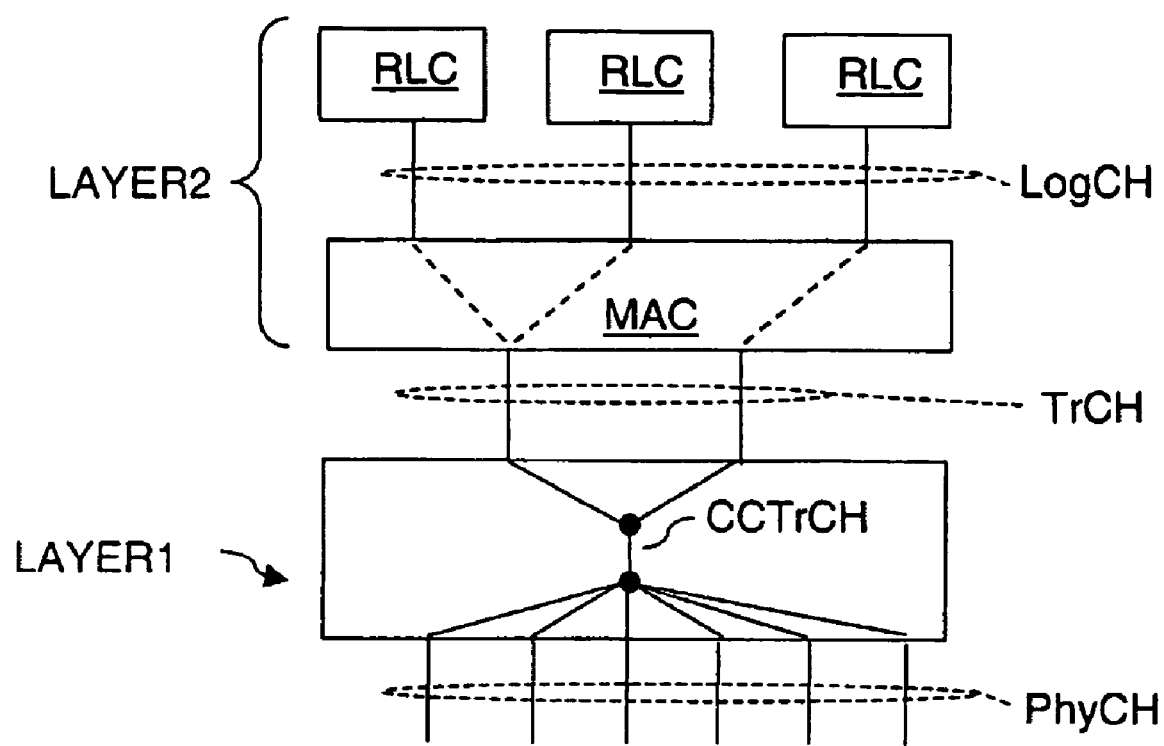
FIG. 1 shows the UMTS architecture of the lower layers of the OSI layer model.
Figure 2:
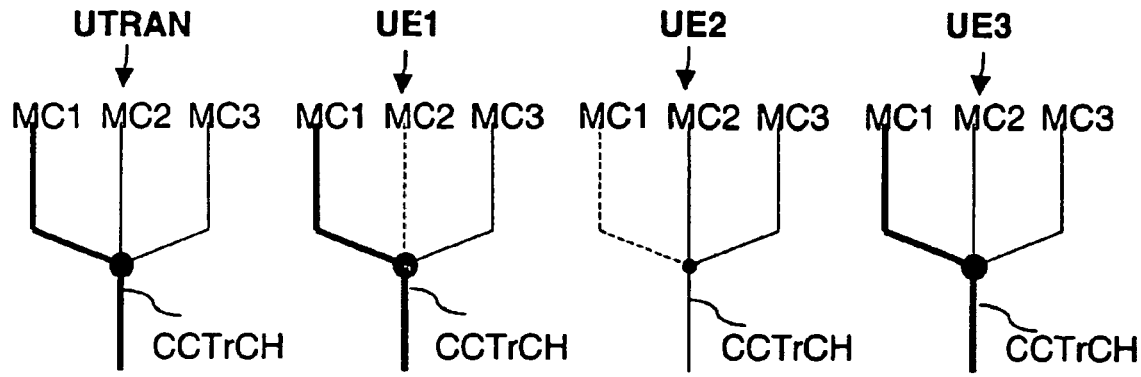
FIG. 2 shows UMTS channel assignment according to the prior art.
Figure 3:
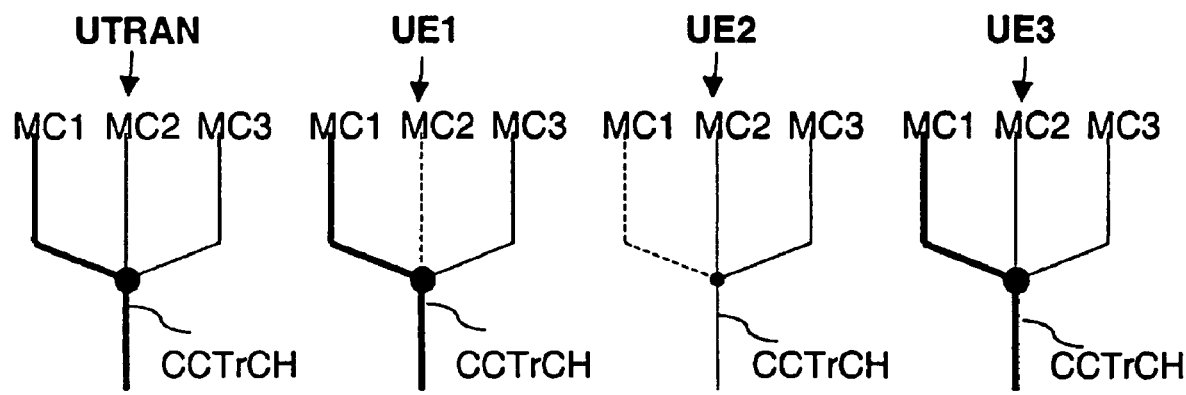
FIG. 3 shows a snapshot of the application of a first step of the inventive method to channel assignment.
Figure 4:
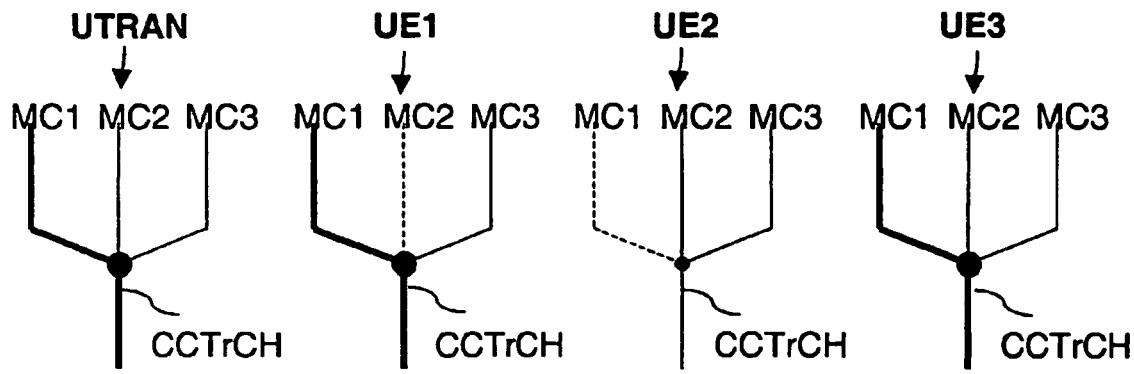
FIG. 4 shows the inventive channel assignment.

FIGS. 2 to 4 show the transport channels TrCH1, TrCH2, TrCH3, respectively, which are mapped onto a CCTrCH. Data for the first multicast group MC1 is transmitted via the first transport channel TrCH1, as according to the exemplary embodiment it is assigned to the first multicast group MC1. Correspondingly, data for the second multicast group MC2 is transmitted via the second transport channel TrCH2 and data for the third multicast group MC3 is transmitted via the third transport channel TrCH3.

The transport channels TrCH1, TrCH2, TrCH3 of the multicast groups MC, to which a mobile radio device UE1, UE2, UE3 belongs, are shown with a solid line, while the transport channels TrCH1, TrCH2, TrCH3 of the multicast groups MC1, MC2, MC3, to which a mobile radio device does not belong, are shown with a broken line. The transport channels TrCH1, TrCH2, TrCH3 of the multicast groups MC1, MC2, MC3 on which data is transmitted within a considered time interval TTI, are shown with solid bold lines.

Allocation of the downlink shared channel (DSCH) resource, that is when data for a specific multicast group MC1, MC2, MC3 is transmitted on the DSCH and the parameters for said transmission, is effected according to the present invention in particular via a common channel associated with the DSCH channel type, to which all mobile radio devices UE1, UE2, UE3 registered with one of the multicast groups listen. When data of a specific multicast group MC1, MC2, MC3 is transmitted, a transport format combination indicator TFCI value is transmitted on this common channel, providing information about the physical channel, via which the DSCH is transmitted, and about the transport format combination TFC to be used. For this purpose, the transport format combination indicator TFCI value identifies a calculated transport format combination CTFC value in a table configured beforehand according to the inventive method. The transport format combination TFC to be used then may be calculated back from this calculated transport format combination CTFC value.

The tables in FIGS. 2 to 4 show the assignment of transport format combination indicators TFCI to calculated transport format combinations CTFC, whereby the calculated transport format combination CTFC values result from a first transport format identifier value TFI1, a second transport format identifier value TFI2 and a third transport format identifier value TFI3 for the corresponding individual transport channels TrCH1, TrCH2, TrCH3.

The first transport format identifier value TFI1 thereby indicates a Transport Format (TF) of the transport format set (TFS) of the first transport channel TrCH1, the second transport format identifier value TFI2 indicates a TF of the TFS of the second transport channel TrCH2 and the third transport format identifier value TFI3 indicates a TF of the TFS of the third transport channel TrCH3, whereby to keep the tables clear and transparent in the exemplary embodiment it is assumed that the transport format sets of the individual transport channels TrCH1, TrCH2, TrCH3 only include the TF values "0" and "1."

To explain the present invention more clearly, FIG. 3 shows how a configuration of transport format combination indicator TFCI values and associated calculated transport format combination CTFC values specific to the mobile radio device would look when applied according to the prior art. During configuration, account was not taken of the fact that a specific transport format identifier TFCI value should signify the same for all mobile radio devices UE1, UE2, UE3 at the time of transmission of the data (TTI) of a specific multicast group MC1, MC2, MC3.

If data for the first multicast group MC1 now has to be transmitted, the network UTRAN selects the transport format combination indicator TFCI value for this. For the first mobile radio device and the third mobile radio devices UE1 and UE3 this is in order and they would receive their data correctly. The second mobile radio device UE2, however, also would listen to the physical channel and expect data for the second multicast group MC2 on the second transport channel TrCH2, on which no data is transmitted.

In order now to plan the configuration of transport format combination indicator TFCI values and associated calculated transport format combination CTFC values such that at the time of transmission of the data of a specific multicast group MC1, MC2, MC3, the transport format combination indicator TFCI value transmitted in a common manner for all mobile radio devices UE1, UE2, UE3 also has the same significance for all mobile radio devices UE1, UE2, UE3, the configurations of the individual mobile radio devices UE1, UE2, UE3 now being determined according to the present invention in the network UTRAN as a function of each other, as shown by way of an example in FIG. 4.

No calculated transport format combination CTFC values are hereby assigned to the transport format combination indicator TFCI values, with which a mobile radio device UE1, UE2, UE3 can "start nothing," because it is not registered with the corresponding multicast group MC1, MC2, MC3. Instead the "no action" command is assigned to these transport format combination indicator TFCI values. A mobile radio device UE1, UE2, UE3, which receives a corresponding transport format combination indicator TFCI value, will ignore this and listen to no further physical channel for the corresponding time interval.

Instead of the "no action" command, a calculated transport format combination CTFC value with the transport format identifier TFI values 0 for all TrCHs also can, alternatively, be assigned as standard to the transport format combination indicator TFCI values, with which a mobile radio device can "start nothing." A mobile radio device UE1, UE2, UE3, which receives this transport format combination indicator TFCI value, would then listen to a corresponding physical channel but would not forward the received data to higher protocol layers.

Alternatively, when configuring transport format combination indicator TFCI values and associated CTFC values, a specific list of transport format combination indicator TFCI values also could be defined. In the example in FIG. 4, this would be the transport format combination indicators TFCI 0, 1 and 3 for UE1 and the transport format combination indicators TFCI 0, 2, 3 for UE2. A mobile radio device UE1, UE2, UE3, which receives a transport format combination indicator TFCI value, which was not defined for it in the list, would ignore this and implement no further actions, such as reading physical channels, for this time interval.

It can be seen from FIG. 4 that the tables for the first mobile radio device UE1 and the second mobile radio device UE2, which have only configured 2 transport channels TrCH, are shorter than the table for the third mobile radio device UE3, which has configured all three transport channels TrCH. This becomes even clearer, when you compare a mobile radio device UE1, UE2, UE3 with only one transport channel TrCH (associated with only one multicast group MC1, MC2, MC3) with a mobile radio device UE1, UE2, UE3, which has, for example, 8 transport channels TrCH (associated with 8 multicast groups). Such an example is not shown for purposes of clarity.

The present invention may be summarized using the example of the UMTS system as follows:

A number of multicast services (or groups) is multiplexed onto a CCTrCH, whereby each group is transmitted via its own transport channel (TrCH) and multiplexing takes place at different times, that is only one multicast group is transmitted in one time segment TTI, whereby the signaling indicating which group is being transmitted is effected via the TFCI, which is transmitted via a common channel.

There are two options for the manner in which a mobile radio station can identify whether a transmission in a data segment transmits data for a multicast group which the mobile station wishes to receive:

The CTFCs are calculated and numbered consecutively taking into account all Transport Formats (TFs) of all transport channels (TrCHs). Each number thereby corresponds to an identifier (TFCI), whereby the mobile radio stations are only informed of the CTFCs, with which data of a multicast group, in which the corresponding mobile station is interested, is transmitted on a transport channel. As the TFCIs are transmitted on a general channel, all the different CTFCs have to be numbered in a standard manner. To this end, the CTFCs are numbered specifically, that is subject to the above consideration, and not numbered in an arbitrary manner by the mobile radio station as according to the prior art. As such, for every CTFC value, the network (RNC), that is at least one inventive network control unit, must also send the TFCI value to the mobile radio stations.

Alternatively, instead of the CTFCs, which are not relevant to a specific mobile radio station, information, such as the "no action" command or a specific value (zero) with the same significance, can be inserted, which informs the mobile radio station of this. The mobile radio stations now number the CTFC values taking this into account. If a mobile radio station receives a TFCI value displayed on the general channel, to which a CTFC value is assigned that corresponds to "no action," the mobile radio station ignores this value and does not receive the corresponding data.

The present invention is hereby not restricted to the UMTS system. Rather, all possible modifications that are within the capability of a person skilled in the art to implement the present invention should be covered in a comparable system.

Indeed, although the present invention has been described with reference to specific embodiments, those of skill in the art will recognize that changes may be made thereto without departing from the spirit and scope of the present invention as set forth in the hereafter appended claims.

The invention claimed is:

1. A method for transmitting a plurality of group messages to a plurality of radio communication devices in at least one radio cell of a radio communication network operating according to a universal mobile telecommunication system standard, each radio communication device belonging to one or more defined groups suitable to receive group messages corresponding to that defined group, the method comprising:
assigning each group message to a respectively dedicated shared transport channel corresponding to one of the defined groups;
transmitting toward the plurality of radio communication devices data of a particular group message intended for a particular defined group during at least one time interval;
transmitting to the plurality of radio communication devices a first indicator, corresponding to the particular defined group during the time interval, and configuring assignment information for the assignment of the first indicator such that each of the plurality of radio communication devices can identify the particular defined group based at least on the first indicator and the assignment information to determine whether that radio communication device is suitable to receive the particular group message;
wherein, based on the assignment information, radio communication devices that are not part of the particular defined group pause during the time interval according to an algorithm.

2. A method for transmitting a plurality of group messages as claimed in claim 1, further comprising storing the assignment information in table form.

3. A method for transmitting a plurality of group messages as claimed in claim 1, further comprising storing the assignment information in list form.

4. A method for transmitting a plurality of group messages as claimed in claim 1, further comprising assigning all radio communication devices of a first region to a first defined group, wherein the particular group message is sent to the radio communication devices assigned at least to the first defined group in a form of a broadcast message.

5. A method for transmitting a plurality of group messages as claimed in claim 1, further comprising transmitting allocation of a transmission time and parameters of the particular defined group message to a specific group via a common channel assigned to at least one dedicated shared transport channel.

6. A network controller for transmitting a plurality of group messages a plurality of radio communication devices in at least one radio cell of a radio communication network operating according to a universal mobile telecommunication system standard, each radio communication device belonging to one or more defined groups suitable to receive group messages corresponding to that defined group, comprising:
means for assigning each group message to a respectively dedicated shared transport channel corresponding to one of the defined groups;
means for transmitting toward the plurality of radio communication devices data of a particular group message intended for a particular defined group during at least one time interval;
parts for transmitting to the plurality of radio communication devices a first indicator corresponding to the particular defined group during the time interval, and configuring assignment information for the assignment of the first indicator such that each of the plurality of radio communication devices can identify the particular defined group based at least on the first indicator and the assignment information to determine whether that radio communication device is suitable to receive the particular group message, wherein, based on the assignment information, radio communication devices that are not part of the particular defined group pause during the time interval according to an algorithm.

7. A radio communication device for receiving at least one group message which is transmitted to a plurality of radio communication devices in at least one radio cell of a radio communication network operating according to a universal mobile telecommunication system standard, each radio communication device belonging to one or more defined groups suitable to receive group messages corresponding to that defined group, comprising:
- means for receiving group messages each assigned to a respectively dedicated shared transport channel corresponding to one of the defined groups;
- means for receiving data of a particular group message intended for a particular defined group during at least one time interval; and
- means for receiving a first indicator corresponding to the particular defined group during the time interval and receiving a configured assignment information for indicating the assignment of the first indicator such that each of the plurality of radio communication devices can identify the particular defined group based at least on the received first indicator and the assignment information to determine whether that radio communication device is suitable to receive the particular group message, wherein, based on the assignment information, radio communication devices that are not part of the particular defined group pause during the time interval according to an algorithm.

8. A method for transmitting a plurality of group messages to a plurality of radio communication devices over a plurality of different transport channels mapped onto the same composite transport channel in at least one radio cell of a radio communication network operating according to a universal mobile telecommunication system standard, each radio communication device belonging to one or more defined groups suitable to receive group messages corresponding to that defined group, the method comprising:
- storing at each radio communication device a set of device-specific configurations defining links between one or more indicators and one or more corresponding group-related values as a function of the number and identity of the defined groups to which that device belongs, wherein for certain radio communication devices, the group-related values linked to the same indicator are different;
- assigning each group message to a respectively dedicated shared transport channel corresponding to one of the defined groups;
- transmitting toward the plurality of radio communication devices data of a particular group message intended for a particular defined group during at least one time interval;
- transmitting to the plurality of radio communication devices a first indicator, corresponding to the particular defined group during the time interval, such that each of the plurality of radio communication devices can access from its stored device-specific configurations the group-related values, if any, linked to the first indicator in order to determine whether that radio communication device is suitable to receive the particular group message.

9. A method for transmitting a plurality of group messages as claimed in claim 8, wherein radio communication devices that are not part of the particular defined group pause during the time interval according to the device-specific configurations accessed by each of the radio communication devices.

10. A method for transmitting a plurality of group messages as claimed in claim 8, further comprising assigning all radio communication devices of a first region to a first defined group, wherein the particular group message is sent to the radio communication devices assigned at least to the first defined group in a form of a broadcast message.

* * * * *